United States Patent [19]
Farkas

[11] 3,791,906
[45] Feb. 12, 1974

[54] METHOD OF USING A COMPRESSIBLE DIE MEMBER TO FORM PATTERNS ON A PLASTIC SHEET INCLUDING THE USE OF A LIQUID PLASTISOL AND DIELECTRIC HEATING

[76] Inventor: Robert D. Farkas, 772 Prospect St., Westfield, N.J.

[22] Filed: Dec. 9, 1971

[21] Appl. No.: 206,363

Related U.S. Application Data
[63] Continuation-in-part of Ser. No. 112,692, Feb. 4, 1971, abandoned.

[52] U.S. Cl.................. 156/245, 156/273, 264/26
[51] Int. Cl........................ B29c 19/04, B29h 5/26
[58] Field of Search ........... 156/273, 231, 232, 245; 264/26, 219–220, 225–227

[56] References Cited
UNITED STATES PATENTS

| | | | |
|---|---|---|---|
| 1,888,344 | 11/1932 | Bon.................................. | 264/219 |
| 3,289,253 | 12/1966 | Buonaiuto.......................... | 264/26 |
| 3,351,510 | 11/1967 | Harris................................ | 156/232 |
| 3,417,175 | 12/1968 | Brown et al. ..................... | 264/26 |

*Primary Examiner*—Douglas J. Drummond
*Attorney, Agent, or Firm*—Ostrolenk, Faber, Gerb & Soffen

[57] ABSTRACT

A die assembly incorporating a resilient die face and/or backing for sealing and/or patterning or texturing plastic and other like material through the use of RF heating. The die face contains all of the texturing, embossing, printing and the like of the surface of the material or object being simulated. The die face and/or the resilient backing material are imbedded or otherwise provided or formed with conductive and/or resistive material to enhance the dielectric heating operation, as well as to provide heat flow toward the plastic load immediately upon the institution of the RF heating operation.

The resilient die faces may be integrated with the cutting edges forming fixed or compound die assemblies for cutting and/or sealing operations which may be performed substantially contemporaneously with the patterning or texturing operations.

1 Claim, 34 Drawing Figures

INVENTOR.
ROBERT D. FARKAS
BY
Ostrolenk, Faber, Gerb & Soffen
ATTORNEYS

METHOD OF USING A COMPRESSIBLE DIE MEMBER TO FORM PATTERNS ON A PLASTIC SHEET INCLUDING THE USE OF A LIQUID PLASTISOL AND DIELECTRIC HEATING

This application is a continuation-in-part of my application, Ser. No. 112,692, filed Feb. 4, 1971 now abandoned, and relates to cutting, sealing and texturing of plastic materials and the like and more particularly to a novel method and apparatus for expeditiously performing these operations in a unique manner.

BACKGROUND OF THE INVENTION

There exist a wide variety of industries and further a wide variety of applications within such industries in which cutting, sealing and/or patterning of plastic materials is required. For example, in the inflatable toy field, it is conventional to provide means for sealing marginal edges of plastic sheets to one another along a seam of a predetermined contour and to cut and tear away the unneeded portions of the joined sheets immediately adjacent the seal (commonly referred to as a tear-seal operation). Other types of operations are utilized in which plastic materials and the like are joined to one another as well as being joined to a fabric substrate of either the woven or non-woven type. Still further applications call for the lamination of the plastic material to metal or the patterning of a plastic material with or without lamination and cutting. In all such applications it is quite frequently advantageous to employ dielectric heating for the heat-sealing of plastic films and fabrics. In such applications, radio frequency (RF) energy is introduced into the work area in the form of a dielectric field produced by a source of high frequency energy having a magnitude of voltage suitable for the thickness of the particular work load. The types of loads typically encountered possess a loss characteristic which cause a rise in temperature in the work pieces produced by the electric field.

The use of dielectric heating equipment for the bonding of thermal plastic materials and the like is a conventional technique. Typically, thin sheets of the thermal plastic material are sandwiched under at least moderate pressure between a pair of metallic electrodes to form a capacitance. A radio frequency high power oscillator is utilized to apply high frequency energy across the capacitance during a predetermined time interval. Heat is generated throughout the thermal plastic material due to the fact that it has a considerable power factor. The heat is generally readily conducted away by the electrodes at the outer surfaces of the two sheets, but not at the inner face thereof. Thus, the temperature at the interface rises to the melting point of the plastic material causing fusing of the two sheets to take place.

In applications in which two plastic members are to be joined, it is conventional to utilize die assemblies of either the compound or fixed die types. Fixed die assemblies consist of a die face and a rigid member having a tapered edge positioned immediately adjacent thereto. The plastic members to be joined are aligned beneath the die face and pressure is exerted upon the plastic members, at which time RF energy is applied. The tapered edge pierces nearly through the sheet (or sheets) and the excess may be stripped away either during the heat-sealing operation or at some time thereafter. One of the major problems in the fixed die assembly results from the fixed relationship between the height of the face of the tapered edge and the face of the sealing or patterning die elements. Once a die is fabricated it becomes limited in its usefulness in terms of a wide range of thicknesses of plastic and fabric loads that differ in thickness radically from the design range of the die. This would require the employment of a large number of die assemblies to accommodate the entire range of thicknesses of the possible loads. Upon completion of the sealing and tearing operation a marginal portion of at least one of the plastic sheets remains and extends beyond the edge of the seal and in between the seal and the tapered edge, if they are spaced apart. This may result in a fraying or deterioration of the edge. Fraying may occur especially in the case where one or more of the plastic sheets is secured to a fabric substrate.

In die assemblies of the compound type, the cutting edge is positioned adjacent to the die face but, contrary to the arrangement in the fixed die assemblies, the cutter is movable relative to the die face. The sealing and cutting operation is performed in two-step fashion wherein a first magnitude of pressure (usually moderate pressure) is applied to cause the die face to be urged under pressure, in the presence of RF energy, against the plastic sheet which may be reinforced with additional plastic sheets or a substrate or interstitial layer of a fabric, metal or other non plastic material not affected by the RF energy so as to melt or directly heat and cause to flow the material comprising that non-plastic layer. Thus, the layer must be cut by conventional means. Upon completion of the heat-seal operation, additional pressure is applied to urge the cutter into the plastic sheet (or load) and thereby perform the cutting operation. The major disadvantage of conventional compound die assemblies also results in the fact that a finite separation exists between the cutting edge and the die face, causing a marginal portion of the plastic sheet (or load) to be present after the cutting operation which may further result in a fraying of the material or in a weakening of the seal, as well as providing an unsightly finish to the members being joined.

Another conventional heat-sealing operation employing RF techniques is that in which a roller is employed to form a pattern or texture upon the surface of a continuously fed plastic sheet (or sheets). One typical embodiment for embossing and/or joining plastic sheets is described in detail in U.S. Pat. No. 3,162,561, issued Dec. 22, 1964 and filed in the name of the present inventor. Although the arrangement of the aforementioned U.S. Patent will not be described in detail, it should be understood that a cylindrical roller having a metallic die face serves as one of the electrodes of the RF heat-sealing apparatus with a continuous closed loop belt serving as the other electrode. In applications wherein the two or more sheets are to be continuously sealed to one another, the drum may have a perfectly plain cylindrical surface. In cases wherein raised or depressed printing is to be provided, the drum may, in turn, be provided with a depressed or raised surface, respectively. In cases where a texture or pattern is to be provided over substantially the entire surface, the surface of the drum is provided with a metallic shett which is characteristics by hand to provide the particular texture or pattern desired. In assemblies of the fixed or compound die type, as well as assemblies of the continuous sealing and/or embossing type, the die faces are typically formed by hand to provide the desired texture since any other technique will not provide the shading of texture required in many applications. Hand-tooled operations of this type require a great deal of time and are therefore quite expensive.

BRIEF DESCRIPTION OF THE INVENTION

The present invention is characterized by providing a novel method and apparatus for heat-sealing and embossing or patterning one or more plastic sheets in which all of the above disadvantages are eliminated while, at the same time, providing a highly simplified method and apparatus for performing the above mentioned operations, as well as providing other attendant advantages and haracteristics not heretofore possible in conventional apparatus of the type described hereinabove.

The present invention, in one preferred embodiment thereof, consists of a method and apparatus in which a die face is formed of a resilient material, preferably silicone rubber, whereby the surface of the die face exactly reproduces the particular pattern and/or texture which is desired to be reproduced.

The die face member is formed by first forming a mold of the particular object or surface to be reproduced. In one method, in the case where the object itself is utilized to produce the die, silicone rubber, in liquid form, is cast onto the face of the object to be duplicated, and allowed to dry for approximately 24 hours. This set rubber, or die face, is then assembled into a die assembly. In the case where a non-continuous embossing or patterning operation is to be performed, the die face is joined to a die assembly comprised of a rigid backing member and having a suitable base material sandwiched between the backing member and the die face. The base material is preferably resilient and is further preferably three or more times the thickness of the face sheet. Since the overall thickness between the electrodes of the RF heating apparatus should preferably be minimized to achieve maximum heating, the apparatus is designed so as to create an effective constant voltage potential across the surface of the die face material which is adhered to the resilient base material. One technique for achieving this is to provide a metallic foil sheet interspersed between the base and die face materials and electrically connected to one terminal of the RF energy source, which is preferably a high frequency generator. The interface between the base and die face materials may or may not be planar. If the reverse of the original product is desired, wax in the liquid state is applied to the product, is allowed to cool and harden, and then the die face is fabricated by pouring the liquid silicone ruber into the wax mold.

Another way to place the interface of the die face material and the base material at the same, or nearly, the same RF potential as the exposed or rearmost face of the die base material, is to electrically couple these two faces with an extremely high capacitance, which is required in order to couple the RF energy from the die mounting side (i.e., the base of the base material) to the plane of the interface of the die face and base materials. Certain metals, in wool, rod, powder, chip or pellet form, such as copper, brass, aluminum amongst others do not heat up to a substantial degree in the presence of a RF field. Thus, they serve to effectively "shorten" the electrical path between the faces of the die base material. The rubber mixed with these particles serves to bind them and acts as a dielectric, of low loss characteristic in the capacitor thus formed.

If the thickness of the face material becomes excessive, it may be desired to limit the RF voltage drop across this face material. Accordingly, the same good conducting metal elements may be added to the die face material.

Another advantage of adding metallic fillers to either base or face materials is that the thermal coupling of these structures are greatly increased and heat may be removed from the plastic load during and after the heating cycle.

Another alternative embodiment of the present invention comprises the use of appropriate materials in order to control or vary the relative hardness or resiliency of the die face sheet and or the base material. For example, certain regions of the die face sheet and/or die base material may be provided with additives (plastic and the like) to alter the hardness or resiliency of that particular region so that certain sections of the final die face sheet and/or base material may be compressed to either a greater or lesser degree than other sections of the assembly. In operation, the die assembly exhibiting these characteristics is pressed into a plastic load whereby the surface of the die face sheet is effectively planar. Upon the application of RF energy, the plastic load heats and begins to flow, enabling those portions of the die face sheet under greater compression to expand and move more deeply into the load material, thereby pressing the heated plastic material away from the region of the load beneath the section of the die assembly experiencing greater compression and causing it to flow toward the region or regions of the die assembly experiencing less compression. Due to the regions of differing compressibility or hardness, the die assembly thus creates an effective planar equipotential line during the initial heating of the plastic load.

It may be desired to induce heat onto the face of the plastic load from the contact to the face material, in addition to the internal heat generated by the RF inside the plastic. This is accomplished by heating the die face or the die base or both by the RF itself during the RF cycle. At the end of the RF cycle the base and/or the face material will cool down since their RF energy has been removed. The internal RF heating of the rubber-like materials is accomplished by adding lossy materials to the base or face materials as they are being fabricated. The material may be of two basic varieties; carbon particles are an example of current squared times resistance ($I^2R$) losses, or metallic material such as iron, steel, nickel, etcetera which heat up by magnetic or eddy current effects in the presence of RF similar to the induction heating process.

If desired, conductive materials (characterized, possibly as a metallic material added to the rubber like base or face material which will not heat up solely by the presence of the RF flowing through it — utilized principally to convert the face or base materials or both into a low loss, highly capacitive, and thus low voltage drop, and good thermal coupling material) and lossy materials (characterized, possibly as carbon or other pseudo-conducting materials that heat up due to the RF passing through them because of their high ohmic characteristics, or magnetic or other metallic materials that heat up in the presence of RF because they exhibit high eddy current skin losses of particle heating due to the magnetic construction and subsequent polar heating in the RF field) may be admixed to obtain the desired heat and cooling effects on the plastic load during, before, and after the RF cycle. Another advantage of mixing metallic materials to the rubber like base or face material is to increase the thermal coupling ability of these materials thereby enhancing the flow of thermal energy toward the load (during heating) and away from the load (during cooling). Heat from a heated platen provided as part of the dielectric heating apparatus may be employed to enhance the heating of the load with the thermal energy developed by such platen being transferred to the load through the metallic additives.

The stiffening or hardening techniques (i.e., the addition of stiffening or hardening ingredients into the resilient material) may be used in combination with the additives of conductive or lossy materials.

The base and die face materials may be the same or may be different, depending upon the factors such as resiliency and cost of the materials.

The method and apparatus of the present invention may be used to great advantage in both fixed and compound die assemblies. In the case of compound die assemblies, cutting edges in the form of steel rules are fixedly secured to the rigid backing plate of the die assembly. The combined thicknesses of the base and face materials are such as to position the cutting edge of the cutting member a small but finite distance below the exterior surface of the die face sheet. The cutting edge is also spaced a sufficient distance beneath the exposed surface of the die faced edge so as to fail to protrude therethrough when the presence of a first magnitude is applied upon the "load" during the RF heating operation. Immediately upon termination of the RF heating operation; increased pressure is exerted upon the die assembly so as to cause the cutting edge of the cutting member to protrude through the exposed face and to cut into the plastic sheet (or sheets) and fabric substrates (if any are present). The cutting edge is positioned so as to lie substantially in the center of that portion of the resilient die face sheet surface which forms the sealing contour or pattern. Thus, when additional pressure is exerted upon the die assembly, the cutting edge protrudes through the die face sheet and pierces the plastic sheet (or sheets) which forms the load so as to perform a sequential sealing and cutting operation. Due to the resiliency of the base and face materials, the compound die assembly may be used to seal and cut "loads" of varying thicknesses since suitable cutting of the material will occur simply by providing pressure of the appropriate magnitude regardless of the thickness of the "load."

A die used on a pure plastic load may or may not have a knife edge, usually formed of brass. If it does, it is called a "fixed" die and the operation is called tear-sealing. Since the load is pure plastic the knife edge being lower than the sealing face almost cuts through the plastic, but at the same time RF energy flows through the knife edge into the plastic to melt the plastic in the immediate region of the knife edge. The tearing operation may be performed during the seal by exerting a lateral force on the plastic load, but most commonly the tear is accomplished after completion of the one-step sealing operation. Only one pressure level is used.

An embodiment of this invention employs a fixed die assembly to work on pure plastic loads and to obtain tear seals as described in the above paragraph, with the aid of a resilient sealing face so as to eliminate the critical height differential between the sealing face and the tear seal knife.

The compound die operates at two pressure levels; low pressure and RF energy are both present for sealing and/or texturing and high pressure for cutting in the absence of RF energy. Fixed dies are also used to achieve the same objectives except that the knife edges are preferably formed of steel. The disadvantage of fixed dies as was mentioned hereinabove, are critical height or narrow range of work load thicknesses for a given height and the gap between the cut edge and the seal edge which causes fraying of the fabric substrate. The novel method of the present invention eliminates both disadvantages. Additionally, in conventional compound dies, the sealing member is metallic, and must be closely fitted to the cutting members. The new method allows the cut to be in the center of, or within the boundaries of any seal. Also, fixed dies of the conventional type are not capable of cutting only (i.e., no sealing) in any one location, as a seal would take place under the knife even though it was not close to a sealing element.

Another distinct advantage of using the present method and apparatus in compound die assemblies resides in the fact that the die face sheet may simultaneously impart a highly detailed texture, pattern, printing and the like upon the sheet being sealed which was not heretofore possible in conventional apparatus of the compound die assembly type without resorting to expensive, hand-tooled, closely fitted metallic dies. In addition thereto, voids, cavities, depressions and the like, may be provided in the die face sheet so as to prevent one or more selected portions of the "load" from being printed upon, textured, patterned or the like, utilizing simple molding techniques.

The method and apparatus of the present invention may further be used to great advantage in fixed die assemblies. The fixed die assembly is comprised of a rigid backing plate having a tapered edge of the appropriate contour rigidly secured thereto. The resilient base and the face sheet layers are arranged to surround the tapered edge and are urged under a fixed, constant, pressure against the "load" with the tapered edge penetrating into the load substantially simultaneously with the urging of the die face sheet into the load. The applied RF energy provides the necessary heating to perform the sealing and tear-seal operation. The magnitude of the applied pressure controls the depth of penetration of the tapered edge into the load.

The method and apparatus of the present invention may also be used to great advantage in continuous patterning or embossing operations wherein the exposed surface of the resilient die face sheet is formed in the manner described hereinabove and is then wrapped about the surface of a rotatable drum. The die face sheet is provided with the appropriate pattern or texture desired. The distinct advantage of forming apparatus of this type is in the simplicity and significantly reduced cost of forming the embossing and/or sealing cylinder. In this embodiment, a base material may be employed, if desired. Either the base material or face material, or both, may be admixed with a metallic, conductive or resistive material, or stiffening material to provide the advantageous heating and cooling characteristics described hereinabove.

Whereas the technique for forming dies having resilient die faces as described hereinabove is relatively simple and straightforward, there nevertheless exists a number of disadvantages for such die members whereby the elimination of such disadvantages would lead to an even more powerful technique than that described hereinabove. For example, the resilient die face cannot be made too thin since the thin die will not withstand continuous and repeated use. As a result, a thicker resilient die requires additional energy sufficient to heat the workpiece being treated and, due to its lossy characteristic, the die face undergoes greater heating during use. The die face is also a poor thermal conductor requiring a longer cooling cycle, as well as a longer sealing (i.e., heating) cycle and, in most cases necessitates the use of cooling techniques. The repeated heating and cooling cycles which the die face undergoes causes the die face to both buckle and degrade after repeated use. Also, the formation of the die face before actual use normally requires a 24 hour setting period.

All of the above disadvantages may be eliminated through the use of a novel metallic die face which is capable of being used immediately after it is formed, which is not lossy and which can withstand repeated use without degrading.

The present invention also incorporates a novel method for forming metallic die faces not heretofore used or even contemplated in this field of use.

The die-forming method of the present invention consists in the use of a metallic material having a relatively low melting point. One suitable material is 50–50 or 60–40 solder. The low melting point metal (or metal composition) is heated in a vessel fited with a chamber communicating with the main vessel portion through a mechanically or electrically operated valve mechanism which functions to meter the amount of molten metal fed to the chamber. The chamber, which functions as a mixing chamber, is fitted with a first orifice communicating with a source of air having an air pressure control means for controlling the rate of flow of air into the mixing chamber. The mixing chamber is provided with a second orifice for expelling the molten metal which has been admixed with air in the chamber at a rate substantially controlled by the air velocity and the rate of flow of molten metal into the mixing chamber. The outlet orifice of the mixing chamber is positioned a spaced distance above the master sheet whose texture is to be reproduced in the die face. The heated droplets of molten metal are expelled from the mixing chamber outlet orifice and are deposited upon the master sheet. The droplets undergo cooling as they exit from the mixing chamber outlet orifice so as to be in the molten state at a level sufficient to cause the droplets to conform to every minute contour of the textured master sheet while at the same time being cooled sufficiently so as to prevent any damage to the master due to heat. The droplets are rapidly cooled as they contact the master sheet so as to form a thin metallic layer which conforms to even the most minute texture or deformation in the master sheet. The metal deposition process continues until a metallic layer of sufficient thickness is formed. A die sheet thickness of the order of 0.10 inches forms a die face which is quite satisfactory for use in the RF heating equipment of the type described herein.

Since the thickness of the die face sheet which is formed through the above described metallic coating operation is non-uniform over the area of the die face, the die face is preferably combined with a resilient backing sheet which compensates for the non-uniformity and thickness of the metallic die face sheet to cause the die face to exert substantially uniform pressure upon the workpiece being textured by the die face. The use of the die face in RF heating apparatus is substantially the same as that set forth hereinabove in connection with resilient die faces except that the metallic die face permits the use of shorter heating and cooling cycles, the metallic die face has insignificant heat losses and the die face may be used substantially immediately after the completion of the metal spraying and forming operation. Die faces formed through the above technique have been found to accurately reproduce even the most minute details in any master sheet which may, for example, be a piece of textured leather, fabric, vinyl, plastic, or wood, to name just a few.

In applications in which a very rugged die face is required, the textured surface of the metallic die face formed by the method set forth hereinabove may be plated with a metal through conventional electroplating techniques. If desired, after completion of the plating operation, the original metallic die face may be heated so as to be melted and removed and replaced by either the metal employed for the plating operation or any other suitable material. Alternatively, a die face comprised of the original low melting point metal and the plating surface (comprised of a "harder" metal) may be employed in the RF heating apparatus. Also, a positive die may be made of the master sheet whereby the surface of the master may be plated with a low melting point with the said material then melted away leaving a negative die. This member is then utilized as a die.

The metallic die face formed by the methods described hereinabove may be employed in either fixed or compound die assemblies to perform heat-seal, tear-seal or any other heating, sealing or cutting method described hereinabove. The temperature levels employed in the above RF heating operations are all well below the melting point of the metallic die face whereby the integrity of the metallic die face is retained. For example, the low metling point metallic materials employed, such as solder or eutectic alloys, have melting points of the order of 600°F, whereas the workpieces are caused to deform and thereby assume the contour of the die faces at temperatures of the order of 300°F.

OBJECTS OF THE INVENTION

It is, therefore, one object of the present invention to provide a novel method and apparatus for sealing and/or embossing plastic materials and the like.

Another object of the present invention is to provide a novel method and apparatus for substantially simultaneously sealing and cutting plastic materials and the like wherein no marginal edges are provided along the cutaway portion of the seal.

Another object of the present invention is to provide a novel method and apparatus for cutting and/or sealing plastic materials and the like through the utilization of resilient or metallic die face members which may be produced in a simple and straightforward manner as compared with conventional techniques.

Another object of the present invention is to provide a novel method and apparatus for producing die assemblies advantageously designed for use in RF heating apparatus in which face members are formed of a metallic material having a low melting point.

Still another object of the present invention is to provide a novel method and apparatus for producing die assemblies advantageously designed for use in RF heating apparatus in which base and/or face members formed of a resilient material are combined with interspersed conductive and/or resistive materials to improve the heating and/or sealing operations of the RF heating apparatus.

Still another object of the present invention is to provide a novel method and apparatus for forming resilient die face sheets useful in RF heating apparatus of the continuous or intermittent embossing and/or sealing type.

Yet another object of the present invention is to provide a novel method and apparatus for sealing and cutting plastic materials and the like which may be combined with fabric or metallic substrates wherein resilient die face sheets are employed.

Another object of the present invention is to provide a novel method and apparatus for texturing, sealing and/or cutting plastic materials and the like which may be combined with fabrics or other substrates wherin metallic die face sheets are employed.

Still another object of the present invention is to provide a novel method and apparatus for sealing and cutting plastic materials and the like which may be combined with fabric or metallic substrates wherein resilient die face sheets are employed and further provided with means for simultaneously embossing and/or patterning the plastic materials in combination with the sealing and cutting operations.

BRIEF DESCRIPTION OF THE FIGURES

These as well as other objects of the present invention will become apparent when reading the accompanying description and drawings in which:

FIGS. 1a–1d are views showing prior art embodiments for embossing, heat-sealing, sealing and cutting, and the like.

FIG. 2a is a perspective view showing a portion of a die assembly which may be utilized in the present invention.

FIG. 2b is a sectional view of a portion of the assembly of FIG. 2a looking in the direction of arrows 2b–2b'.

DETAILED DESCRIPTION OF THE FIGURES

Figure 1A:
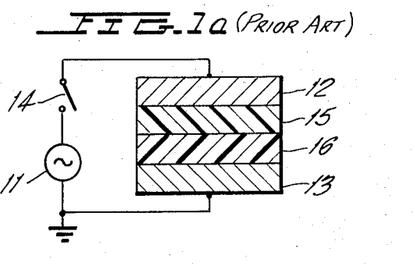

FIG. 1a shows a simplified prior art embodiment 10 for performing an RF heat-sealing operation. As shown therein, an RF oscillator 11 may be selectively coupled to a pair of electrodes 12 and 13 upon closure of a switch means 14 which may, for example, be an electronic device as is shown in FIG. 1a in simplified fashion for purposes of brevity. Switch means 14 may be comprised of an electronic timer for precisely controlling the time interval during which RF energy is coupled to electrodes 12 and 13. The electrodes 12 and 13 form a capacitance having plastic sheets (which may be of a thermoplastic material) 15 and 16 positioned therebetween and held in contact by maintaining electrodes 12 and 13 under at least mild pressure. Electrodes 12 and 13, together with the plastic sheets 15 and 16 sandwiched therebetween under pressure, form a capacitance. A radio frequency high power signal is applied across the capacitance over a predetermined time interval. Heat is generated in the thermoplastic material to cause the material to rise to the melting point and allow fusing of the sheets to take place. Termination of the RF energy causes cooling after which the plastic sheets 15 and 16 remain in the fused condition. The present invention may be used to great advantage in such simplified systems as well as other systems to be described hereinbelow.

Figure 1B:
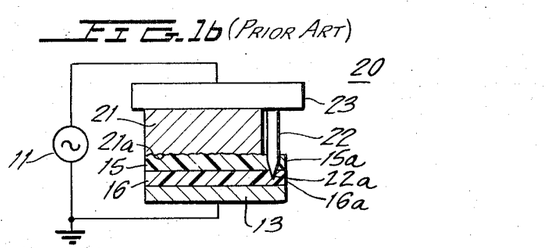

FIG. 1b shows apparatus 20 for performing a sealing and subsequent tearing operation. As shown therein, the RF oscillator 11 is electrically coupled to a metallic die member 21 having a die face 21a adapted to form a seal seam of a predetermined contour upon the plastic sheets 15 and 16. A rigid member such as for example, a brass rule 22 having a tapered outer edge 22a, is positioned in close proximity to die 21 and is further secured to rigid backing plate 23 which may, for example, be aluminum. Die member 21 is also preferably rigidly secured to backing plate 23.

As can clearly be seen in the arrangement of FIG. 1b, the tapered edge 22a of rigid (preferably metallic) member 22 extends a finite distance below the sealing surface 21a of die member 21 so as to penetrate into either one or both of the plastic sheets 15 and 16. Die member 21, being formed of a conductive material, serves as one of the electrodes and cooperates with electrode 13 to form a capacitance circuit for RF heating. A sufficient pressure is applied to members 13 and 23 so as to cause tear-sealing member 22 to piece one or both of the plastic sheets 15 and 16. RF energy is applied across the electrodes causing heating and fusion of the plastic sheets 15 and 16. Although the tapered edge 22a does not penetrate completely through the sheets, the tapered edge extends into the sheets by a depth sufficient to permit the marginal portions 15a and 16a to be "torn away" during or immediately subsequent to the RF heating operation. The embodiment of FIG. 1b utilizes a "fixed die" assembly as a result of the fixed positions of the tapered member 22 relative to the die face 21a. In applications wherein a plastic sheet is to be fused, sealed or otherwise joined to a fabric substrate, the plastic sheet 16 may comprise, in part, a woven or non-woven fabric sheet or metal which serves as the substrate for the plastic sheet 15 which is being joined thereto but 22a will not allow tear-sealing of the non-plastic substrate or fabric, as the non-plastic material is not heated by the RF energy.

Figure 1C:
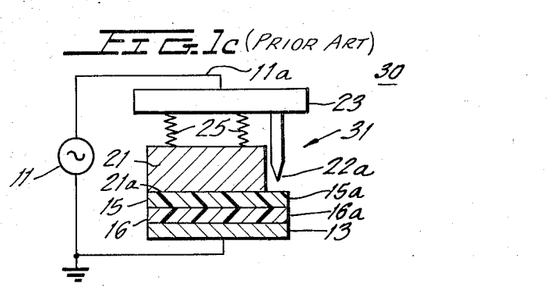

FIG. 1c shows still another prior art embodiment 30 in which a compound die assembly 31 is employed. In the embodiment of FIG. 1c, the rigid backing member 23 is joined to a metallic die member 21 through biasing members such as, for example, springs 25. One terminal of the RF energy source 11 is coupled through a suitable lead 11a to the conductive die member 21 in the manner shown. The steel rule 22 having a tapered edge 22a is rigidly secured to rigid backing plate 23 and is also electrically coupled to RF energy. Conductive die member 21 and electrode 13 serve as the electrodes for the capacitance at low pressure levels. Pressure is exerted upon backing member 23 and electrode 13 sufficient to urge sheets 15 and 16 into intimate contact but insufficient to cause the tapered edge 22a to either pierce or engage plastic sheets 15 and 16. The RF energy is applied to the assembly so as to cause heat-sealing of the members. Again, the face 21a of die member 21 is provided with a raised portion thereof for forming a seal of a particular contour in the sheets 15 and 16.

Upon completion of the sealing operation, RF energy is removed and additional pressure is applied to members 23 and 13 which is sufficient so as to cause the tapered edge 22a of the steel rule 22 to pierce through and completely sever sheets 15 and 16.

It should further be understood that fixed die assemblies of the type shown in FIG. 1b may also be used in seal-cut operations through the use of a two-pressure system.

Figure 1D:
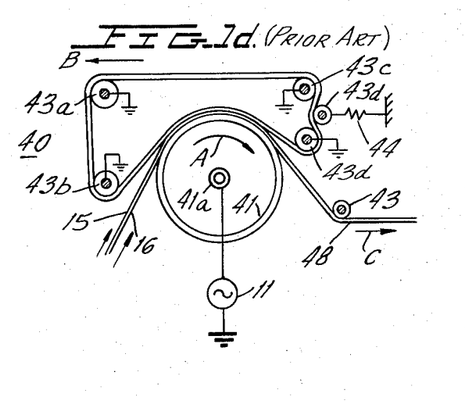
Figures 1E, 2C:
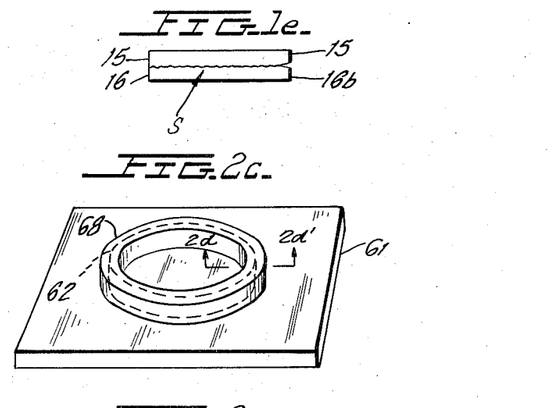
FIG. 1e is a detailed view showing two plastic sheets joined through the use of conventional die assemblies.
FIG. 2c shows a perspective view similar to that shown in FIG. 2a in which the resilient base material has been added.

FIG. 1e shows a sectional view of sheets 15 and 16 with a seal S being formed between the two sheets. The cut produced by steel rule 22 indicates that a marginal portion 15b and 16b of each of the sheets 15 and 16, respectively, remains beyond the region of the seal S. This is extremely undesirable, especially in the case where sheet 16 is a fabric substrate or a plastic sheet containing a fabric material since the marginal portion 16b thereof will have a tendency to become frayed and thereby provide an unsightly appearance which is extremely undesirable in a number of different applications.

FIG. 1d shows apparatus 40 useful in continuously sealng and/or embossing plastic sheets 15 and 16. In the embodiment 40, there is provided a metallic drum 41 rotatable about a central shaft 42 and electrically connected to RF energy source 11. A woven metallic closed loop belt 42 is entrained about a plurality of rollers 43a–43d which are all rotatable, but whose axes are restrained from experiencing any linear movement. A fifth roller 43e is urged under control of a biasing member 44 against the exterior surface of metallic belt 42 so as to maintain the belt under constant tension. The portion of the belt which lies between rollers 43b and 43d conforms to the contour of metallic drum 41 so as to exert a force upon sheets 15 and 16 which are fed between the surface of drum 41 and the exterior surface of belt 42. Drum 41 is rotated in the direction shown by arrow A while belt 42 is moved in the direction shown by arrow B, causing the sheets 15 and 16 to be continuously fed therebetween so as to be fused to one another. The fused sheets exit at the right-hand side of the assembly and move about a roller 47 so as to move in the direction of arrow C wherein the fused composite sheet 48 may be fed to a take up spool or reel (not shown for purposes of simplicity).

In the case where sheets 15 and 16 are simply to be fused to one another, the exterior surface of drum 41 may be a smooth, cylindrical surface. In the case where it is desired to imprint a particular pattern or certain printed material upon the surface of the sheets, the surface of drum 41 may be provided with a particular pattern or with printed material which may either be raised or embossed upon the exterior cylindrical surface. In the case where a graded pattern (as opposed to a pattern of sharp contrast) is to be provided upon the exterior cylindrical surface of drum 41, it is typical to have the particular pattern desired to be hand-tooled upon the metallic surface of the drum which is a rather tedious time-consuming and expensive operation. The hand-tooling is sometimes performed upon a substantially flat sheet which is then wrapped about the surface of the drum to form a drum assembly as is described in detail and as is shown in FIGS. 1 and 5 of U.S. Pat. No. 3,188,259.

All of the prior art embodiments described hereinabove have the disadvantages of requiring expensive (and usually handtooled) die faces formed of metal and those embodiments utilizing cutting edges have the additional disadvantage of providing an unsightly finished product in which the marginal edges of the joined sheets remain in the vicinity adjacent to the seal between the joined members.

The present invention overcomes all of the aforementioned disadvantages through the use of extremely simplified structures which may be simply and readily formed and assembled so as to be utilized in RF heating equipment to achieve all of the advantages of such equipment without the attendent disadvantages in the prior art structures of FIGS. 1a–1d, described hereinabove.

One of the major concepts of the present invention resides in the use of a resilient, non-metallic die face sheet which may be utilized in conjunction with RF heat-sealing equipment to perform sealing or embossing operations, or to perform both such operations simultaneously. The resilient material is capable of exactly reproducing any pattern, texture or other contour through the use of a method which is simple to perform and inexpensive insofar as both cost of materials and manual operations are concerned.

Figure 4A:
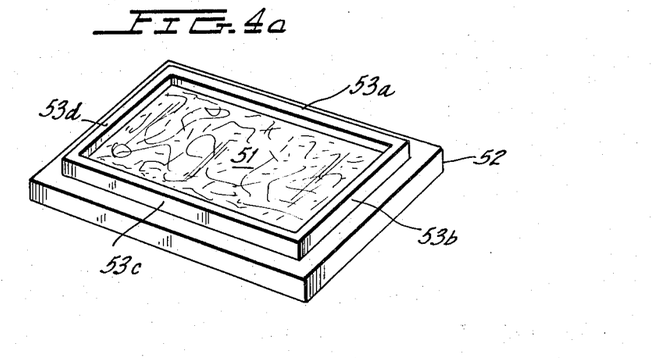
FIG. 4a is a perspective view showing a mold which may be used in the present invention.

Let it be assumed that it is desired to produce a plastic sheet having a predetermined texture or pattern. For example, it may be desired to produce a plastic sheet having the appearance and feel of a grainy leather. To produce this effect, the actual sheet of the grainy leather may be laid out upon a flat surface as shown, for example, in FIG. 4a, in which a sheet of leather 51 is secured or otherwise maintained in position upon a rigid backing member such as, for example, a sheet 52 of wood. A "dam" constructed of four strips of wood 53a–53d, for example, is built up around the marginal portion of the leather sheet 51. The die face sheet material which may preferably be silicone rubber is then poured into the "mold" so as to fill the mold to a desired depth whereby the silicone rubber material enters into all of the recesses, contours and the like of the leather sheet so as to exactly conform to the grainy leather surface. The silicone rubber material is allowed to harden and is then removed from the "mold" for use in any one of a plurality of die assemblies which, in turn, are utilized in RF heating equipment in a manner to be described hereinbelow. The characteristics of the resilient die face material is such that it is capable of being cured to form a resilient rubber at room temperature, it remains flexible even at temperatures well below 0°F. and will further withstand temperatures up to as high as 300°-500°F., will not appreciably shrink or weather, will not harden, crack or dry out and will precisely reproduce surfaces, contours and the like to a degree of detail not easily attained by the use of conventional methods. Its flexibility further permits the reproduction of complicated shapes and undercuts.

Die face sheets formed in accordance with the method described hereinabove are preferably used in die assemblies which further incorporate a resilient base material utilized as a backing for the die face sheet. FIGS. 2a–2e show a stepwise procedure for forming a die assembly which may be utilized for heating and sealing a plurality of plastic sheets or for selectively bonding a plastic sheet to another plastic sheet, with or without a fabric substrate, in a seal-cut operation, for example. It is desirable to provide a resilient backing of a thickness substantially greater than the thickness of the die face sheet which usually is of the order of 1/64–1/2 inch so as to enable a sufficient amount of compression of the combined resilient base material and die face sheet material to enable adequate pressure to be exerted uniformly over the load upon the application of a first magnitude of pressure and to further enable additional compression to occur under a still greater exertion of pressure to cause the cutting edge to pierce the material being sealed in order to perform the cutting operation, as will be more fully understood hereinbelow.

FIG. 2a shows a first step in producing the composite die assembly (which also may be referred to as a compound die assembly). The apparatus 60 of FIG. 2a is comprised of a rigid member 61. Let it be assumed that the seal to be formed in a plastic load is generally circular in shape, that two members are to be joined along a circular seal and that the material is to be cut in the center of the seal so as to eliminate the presence of any marginal edges extending beyond the seal. In such applications, a circular section of wood 61a is removed from the wooden member 61 with the perimeter of the cutaway portion substantially exactly conforming to the circular cut to be made. The circular disc 61a is removed from the wood member 61 and a steel rule 62, having a tapered edge 62a (see FIG. 2b) is fitted into the opening cut into wooden member 61. Bolts, such as for example, bolt 64, are passed through the steel rule and the wooden block in the manner shown best in FIG. 2b so as to rigidly and firmly join the steel rule to the piece of wood 61 having the cutaway opening. A plurality of openings such as, for example, opening 61c is provided in block 61 to receive nut 64a which threadedly engages bolt 64. The remaining wooden disc 61a is then reinserted into the cutaway opening so as to be firmly force fitted therein. The resultant assembly is thus comprised of a rigid backing member (the wood member 61) having a steel rule with a tapered (cutting) edge 62 extending outwardly therefrom by a finite distance. The rear surface of block 61 is flat and the steel rule is adapted to electrically engage an associated electrode (not shown) of the RF heating apparatus.

Figure 2D:
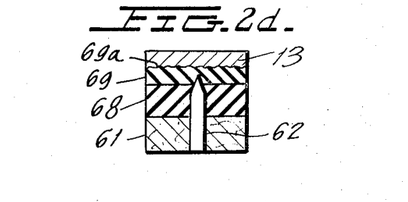
FIG. 2d is a sectional view of the assembly of FIG. 2c looking in the direction of arrows 2d–2d'.
Figure 2E:
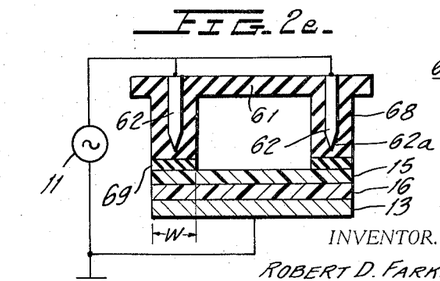
FIG. 2e is a sectional view of a completed die assembly of the type shown in FIGS. 2a–2d.

A dam is provided around the interior of steel rule 62 and around the exterior thereof, which may be comprised of strips of wood forming concentric walls relative to steel rule 62 with the inner and outer walls being as shown by the designating numerals 66 and 67, respectively, in FIG. 2b. The entire annular hollow space defined by the inner and outer dams 66 and 67, respectively, are then filled with a resilient material 68 to a height sufficient to cover cutting edge 62a in the manner shown best in FIGS. 2b and 2c. The resilient base material 68 may be the same as the die face sheet or may be of another suitable material. The die face sheet which may be produced in the manner described hereinabove in connection with FIG. 4a, for example, and which may, for example, have a ring-shaped configuration is fitted into the die assembly so as to be positioned upon the exposed surface 68a of resilient base material 68 whereby the die face sheet 69 is shown bset in FIG. 2d. The exposed surface 69a of the die face sheet is the surface which comes into contact with one of the plastic sheets being joined. FIG. 2e shows the completed die assembly 60 incorporated into RF heating apparatus. The base and face materials may be the same material and, if desired, may be formed in one substantially simultaneous operation.

In operation, RF energy is applied to the die assembly 60 which incorporates an electrode, not shown, and to be described more fully hereinbelow, which together with electrode 13 yields the desired lossy capacitance for the RF heat-sealing operation. RF energy of the requisite power level is applied to the assembly for sealing sheets 15 and 16 to one another to form an annular shaped seal having a relatively narrow width substantially equal to the width W of the resilient die face sheet 69 and face material 68. Upon completion of the heat-sealing operation, additional pressure is applied to the die assembly (preferably against rigid backing member 61) which causes the sheet 69 and backing material 68 to compress to a degree sufficient to enable the annular shaped cutting edge 62a to pierce through sheet 15 and at least a portion of sheet 16 whereby the excess material may be "torn away". It should carefully be noted that the tapered cutting edge 62a of the steel rule is positioned so as to lie within the confines of the seal itself as is the case with the seal provided in the arrangement shown in FIG. 1e. Removal of the compressing force causes the materials 68 and 69 to return to their normal shape and volume whereby the steel rule, including the tapered cutting edge 62a is again within the body of the material 68 as is shown in FIG. 2.

A variety of sequential heat and pressure steps may be employed to fulfill certain associated objectives.

Some of the more pertinent methods and their method steps are as follows:

Considering the embodiment of FIG. 2e, for example, let it be assumed that a sealing and subsequent cutting operation is to be performed and that the plastic load does not incorporate any fabric substrate. In such case, pressure is applied to the die assembly 60 shown in FIG. 2e in the direction shown by arrow P to press the die assembly into the plastic load to a degree insufficient to cause the tapered edge of rigid steel rule 62 to abut plastic sheet 15. Although the tapered edge 62a may slightly enter into the sheet 15, the tapered edge will not "cut" the plastic sheet in the normal sense. Application of RF heating at this time concentrates the RF energy in the region of the sealing portion whereby the plastic load heats up sufficiently to enable the tapered edge 62a of the rigid member 62 to gradually pass through the first and second sheets 15 and 16, respectively, of the plastic load until the tapered edge has passed through both sheets. As a practical matter, a thin sheet of paper may be placed between plastic sheet 16 and electrode 13 to act a a buffer so as to prevent undue wearing of the tapered edge. Using these method steps, the sealing and cutting operations occur substantially at the same time.

Since the plastic load will be subjected to intense heating only in the immediate region of the tapered edge 62a, a certain amount of the plastic may flow and become fused across the bottom most portion of the location in which the cut is to occur (i.e., in the location between sheet 16 and electrode 13). In order to assure that a complete cut will be made through the load, the pressure applied to the die assembly 60 (not arrow P) may be released and then reapplied, whereby the reapplication of pressure is of a magnitude sufficient to cut entirely through the plastic load.

Still another method which may be applied is one in which a cut is initially made through the plastic load in the absence of RF energy and in which the heat sealing operation occurs subsequent thereto. The embodiment of FIG. 3g may be employed in this application, although other embodiments may utilize the following method steps in order to achieve equal success in the performance of the method steps.

Pressure P is applied to the die assembly to a degree sufficient to cause the tapered edge 62a of the rigid member 62 to cut completely through the plastic load (i.e. sheets 15 and 16). In such applications it is preferable to provide a buffer, may be in the form of a thin paper sheet, between plastic sheet 16 and electrode 13. After completing the cutting operation, RF energy is then applied to perform the heat-sealing operation.

Still another method which may be employed is to press the die assembly (for example, die assembly 60 of FIG. 2e) into the plastic load and to apply RF energy. A moderate degree of pressure may be applied so as to initially keep the tapered edge 62a of the rigid member 62 within the die face and/or base material 69 and 66, respectively. Thereafter, the RF energy may be removed and pressure of a much greater degree applied to the die assembly to cause the rigid member to engage the plastic load under pressure sufficient to cut or nearly cut through the sheet or sheets of the plastic load. Immediately thereafter RF energy may be applied to the die assembly and especially to the rigid metallic member to cause the plastic sheets to experience intense heating in the immediate region of the cutting edge and thereby provide a smooth and finished edge.

Considering the embodiment of FIG. 3g of the present invention, let it be assumed that a plastic load is to be sealed in a first region and that a cut is to be made in the plastic load a spaced distance from the seal. As one example, it may be desirable in certain applications to provide a flap of a predetermined length which is spaced a predetermined distance from the seal. This is accomplished in an embodiment of the type shown in FIG. 3h wherein the base and face materials 68 and 69, respectively, are arranged upon the die assembly 60 a predetermined distance from the rigid member 62 having tapered edge 62a. The method steps utilized in such an application consists of initially applying pressure (see arrow P) of a moderate degree to the assembly so as to cause the sealing members 68 and 69 to firmly engage the plastic load (sheets 15 and 16) but insufficient to bring the tapered edge 62a into engagement with either sheets 15 or 16. RF energy is applied to provide a seal in the region having a relatively narrow width W. Thereafter, RF energy is removed and pressure of a greater magnitude is applied so as to cause the tapered edge 62a to cut cleanly through the plastic load (sheets 15 and 16).

In the case where the plastic load is provided with an underlining fabric layer, the method for heating and sealing and cutting must include one step which comprises the application of a force sufficient to cause the tapered edge of the rigid member 62 to cut cleanly through the fabric. This is necessary since the fabric layer will not heat to any satisfactory degree so as to enable cutting of the fabric layer under the combined presence of RF heating and to the application of moderate pressure to the die assembly.

In cases where it is desirable to extend the narrow sealing width W of FIG. 3g the present invention provides further techniques to achieve this result. Heating is accomplished in the load under and in the immediate vicinity of metallic member 62. As width W increases to the left of rigid member 62 (relative to FIG. 3g), heating diminishes. This is due to a falling away of the field strength in moving further away from the rigid member 62. It is desirable to place the entire surface 69a' at the same potential as the rigid metallic member 62.

Figure 3A:
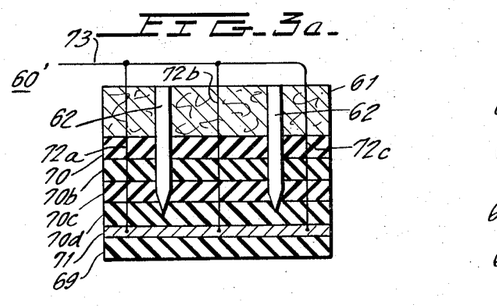
FIGS. 3a–3h are sectional views showing different die assemblies which incorporate the principles of the present invention.

FIG. 3a shows one alternative embodiment in which this is accomplished. The die assembly 60' of FIG. 3a is similar to the die assembly 60 shown in FIG. 2e (with like elements being designated by like numerals) to accomplish heating for any size surface but for the following exceptions:

The rigid wood backing member 61 has affixed thereto layers or sheets of a resilient backing material which, in the case of the embodiment 60', consists of layers 70a–70d of gum rubber which are pressed on to the backing plate so as to cause the steel rule 62 to cut through the layers in the manner shown. The interface between the outermost layer 70d of gum rubber and die face sheet 69 is provided with a thin foil metallic sheet 71 which is sandwiched between the outermost layer of gum rubber 70d and the die face sheet 69. The metallic foil sheet 71 is electrically connected to a plurality of leads such as, for example, the leads 72a–72c which, in turn, are coupled to one common lead 73 which is connected to the RF generator (not shown in FIG. 3a for purposes of simplicity). This embodiment thereby establishes an electrode which lies much closer to the electrode 13 (see FIG. 2e, for example) in order to form a capacitance which yields an evenly distributed RF heating region. As shown in FIG. 2e, portions of the gum rubber layers 70a–70d, the metallic foil layer 71 and the die face sheet 69 may be cut away so as to form an annular shaped sealing surface to provide the sheets being joined with an annular seal in the manner described in connection with FIG. 2e.

Figure 3B:
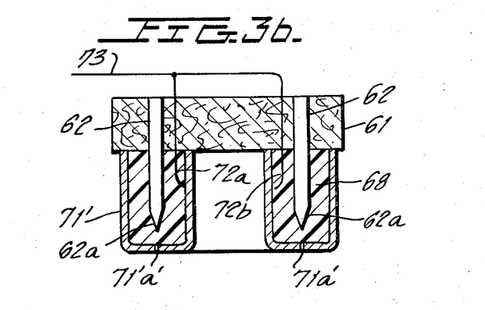

If desired, for certain applications, the die face sheet 69 of FIG. 3a may be omitted and the entire exposed surface of the base material 68 may be coated with a metallic material 71 such as, for example, copper in the manner shown in FIG. 3b. In such applications, pressure is exerted upon backing member 71 (i.e., the wood block) causing the metallic coating to engage the uppermost sheet and form an annular seal between the sheets 15 and 16 (see FIG. 2e). Upon completion of the dielectric heating operation, additional pressure is exerted upon backing member 61 to cause the cutting edge 62a of the steel rule to protrude through the backing material 68 and the annular shaped slit 71a' formed in the copper coating 71' to cut excess material away whereby no unsealed portion of the joined sheets remains to provide a very neat completed product and thereby to prevent any fraying from occurring. In a manner similar to that shown in FIG. 3a, the conductive coating 71' may be joined to conductive leads 72a and 72b for example, which leads are, in turn, coupled to a common conductor 73 for connection with the RF energy source.

Another technique for providing an "effective electrode" as close as possible to the "load" is to immerse a metallic material into the backing material 68 and/or the die face sheet 69. Considering FIG. 3c, for example, the resilient backing material 68 contains a metallic powder, particles or wool such as, for example, aluminum, another non-magnetic material or a copper powder which is dispersed in a substantially homogeneous manner throughout the backing material. This may be accomplished by mixing the resilient material with the metallic powder prior to filling the "dam" with the resilient material.

The die face sheet 69 may be joined to the exposed surface of the backing material 68 in any suitable manner such as, for example, by heating, utilization of an adhesive or any other suitable joining method.

Figure 3C:
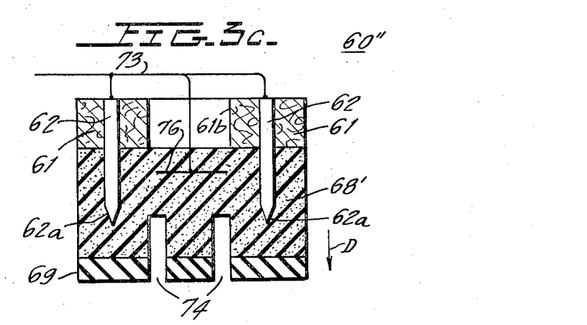

FIG. 3c shows a die assembly 60'' in which the backing material 68' has a lossy metallic powder dispersed rather homogeneously therethrough. RF energy causes the metallic particles to heat up, thereby causing heat to flow in the direction shown by arrow D toward the plastic sheets being embossed and/or sealed (note the plastic sheets 15 and 16 shown in FIG. 2e). In addition thereto, the homogeneously dispersed metallic particles act to create an "effective electrode" along the interface between backing material 68' and die face sheet 69 so as to effectively operate as one unipotential electrode of the RF capacitance. In the embodiment of FIG. 3c sections of the resilient materials 68' and 69 are cut away, as shown by the cavities 74 indicating that those portions which are to be neither textured nor embossed may be prevented from being so textured simply by cutting away materials 68' and 69 to a depth sufficient to prevent surface contact between the die face sheet 69 and the plastic sheet (or sheets) being embossed and/or sealed. A suitable lead 73 is provided for electrically coupling the backing material 68' to the RF energy source (not shown in FIG. 3c). Rigid backing member 61 may be provided with an opening 61b for passage of the lead which, in turn, may be coupled to a metallic plate 76 or alternatively may be electrically coupled to the steel rule 62 to couple energy to the material 68' containing the dispersed metallic particles.

As an alternative embodiment, the particles interspersed within the backing material 68' may, for example, be resistive in nature. One suitable material is carbon which may be dispersed rather homogeneously throughout the resilient backing material 68' so as to create a resistivity characteristic. The passage of a current therethrough causes substantial heating of the material which serves to still further heat the sheets being joined and/or sealed by providing heating immediately upon application of RF energy to the die assembly which heat moves in the direction shown by arrow D and is transferred through the die face sheet 69 to the load.

Figure 3D:
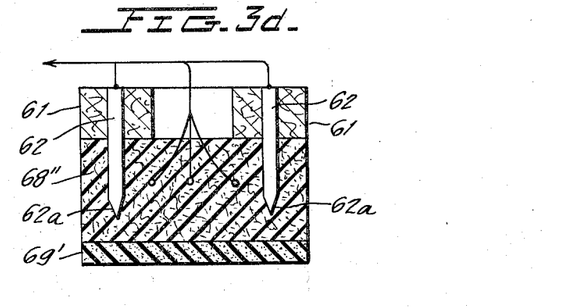
Figure 3E:
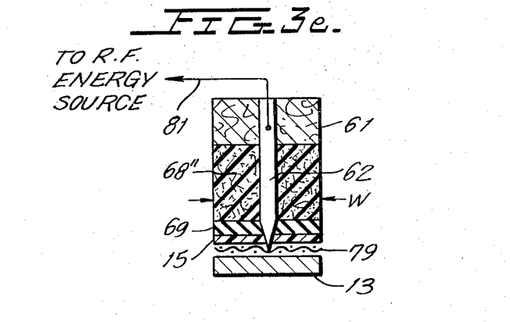

FIG. 3d shows still another embodiment of the present invention in which the resilient backing material 68'' is filled with a metallic wool material (i.e., of the nature of metallic filings or elongated threads) which serve to provide the necessary metallic or conductive consistency substantially homogeneously throughout the resilient backing material 68''. As another alternative, the resilient backing material 68'' may further be provided with both a conductive and a resistive filler to provide both resistive heating and RF heating to still further enhance the embossing and/or sealing operation. FIG. 3d shows the die face sheet 69' as containing either a metallic filler or a resistive filler (or in certain applications both such fillers) to still further enhance the heating operation. As is the case with the resilient backing material 68'', a metallic filler serves to improve RF heating of the load being sealed and/or embossed. The die face sheet acts as a thermal coupler, even in conventional arrangements. For example, immediately upon initiation of an RF heating operation, the load will begin to heat substantially immediately, causing the metallic electrode (for example, the metallic electrodes 12 and 13 shown in FIG. 1a) to carry heat away from the plastic sheets and thereby reduce the effect of the dielectric heating operation. In some applications, it has been suggested that the conductive electrode be heated by an external source to apply immediate heating to the load. Even though this has the disadvantage of slow cooling after completion of the RF operation since the conductive electrodes remain hot long after termination of the RF energy, external heating is nevertheless desirable in certain applications. Fillers can be added to the base material for several purposes but are of three basic categories    a. Good electrical conductors — most often provide good thermal coupling.
   b. Poor electrical conductors — most often provide low thermal coupling.
     (ii) Magnetic/eddy current heatable metallic materials provide good thermal conductivity.
   c. Insulating (stiffening) materials — provide generally poor thermal conductivity.

The specific materials of the above categories are, respectively:

a. copper, brass, aluminum, copper-plated steel: powder, wool, pellets, rods, filaments, balls.

b. (i) carbon, chemicals with moderate conductivity; powder or liquid electrolytes for low thermal coupling, and
   (ii) iron, magnetic stainless steel, steel nickel nichrome.
c. glass fibres, woven fabrics or insulation in rod and bead form as well. Metallic woods or other metallic elements in thread-like or woven form may be used as stiffeners, if desired.

It is imperative to bring the back side of the face material as close to the potential as possible as the back of the die mounting plate to limit the RF voltage drop in the base material or to control the RF equipotential lines of distribution in any desired manner. The voltage gradient may also be modified in a non-uniform manner to achieve other desired results. Additives of the types described above may be added to the arrangement of FIG. 3d, for example, to attain certain objectives. Die face sheet 69' formed of a substantially resilient insulating or rubber-like material typically acts as a thermal coupler which carries a moderate amount of heat away from the heated plastic load. To provide substantially immediate initial heating of the load (i.e. to transfer heat from the die assembly to the load other than the heat generated by dielectric heating in the load), resistive material (i.e. carbon) may be added to the die face sheet 69'. Thus, upon initiation of the RF heat-sealing operation, heat is not carried away from the load but is introduced into the load by virtue of the nature of the die face sheet 69'. In order to enhance the transfer of heat from the load to the die assembly (upon cooling) conductive metallic material may be added. The additives may be selectively combined to achieve a compromise of the various objectives.

Figure 5A:
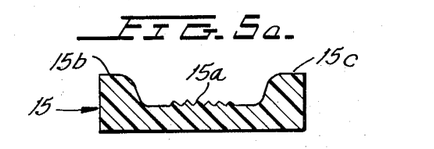
FIGS. 5a–5d are elevational views of still other embodiments of the present invention.
Figure 5B:
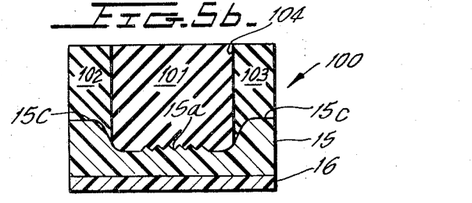

Let it be assumed that a plastic load, after undergoing an RF heat-sealing operation, should assume the shape and contour as shown in FIG. 5a. As shown therein, the plastic sheet 15 has a patterned or textured central portion 15a and raised end portions 15b, 15c. In order to accomplish this result, a resilient member of the type shown in FIG. 5b may be employed. The composite resilient member 100 of FIG. 5b is comprised of a central portion 101 and outer portions 102 and 103 wherein the central portion 101 may be comprised of silicone rubber whereas the outer portions 102 and 103 may be comprised of silicone rubber with a suitable additive (such as fibrous material and the like) which increases the hardness or reduces the compressibility of sections 102 and 103. In preparing the die member 100, a thin sheet or other suitable dam 104 may be inserted to separate the materials of differing hardness or resiliency. The material 101 may then first be poured into the mold. Once the material has been set to a degree, the remaining material, with the hardening additive, may then be poured to form the compound resilient member 100.

Figure 5C:
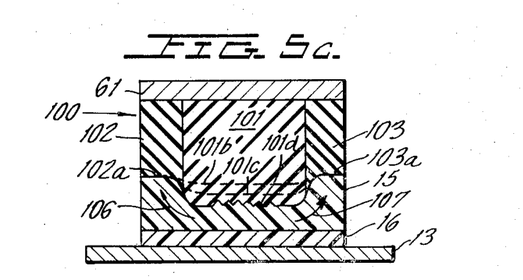

The member 100 is mounted upon a rigid backing plate 61 (see FIG. 5c) and is compressed against a load (sheets 15 and 16) whereby the sheets are sandwiched between the compound resilient member 100 and electrode 13. Due to the greater resilience or compressibility of central portion 101 relative to outlying portions 102 and 103, the faces 101a, 102a and 103a are aligned substantially in a horizontal plane which is co-planar with the upper face of sheet 15. RF energy is applied whereby sheets 15 and 16 heat up. As the plastic begins to flow, the central portion 101 begins to move more deeply into the plastic load (as shown by dotted lines 101b and 101c) until the material reaches the final position represented by dotted line 101d. Due to the increased hardness or substantially reduced compressibility of mold portions 102 and 103, these portions undergo almost no expansion. In addition to being capable of achieving a finished product having the shape and contour as is shown in FIG. 5a, the ever expanding central portion 101 acts to urge plastic material which becomes heated immediately beneath surface 101a to be urged outwardly toward the outlying sections as shown by arrows 106 and 107, respectively.

Figure 5D:
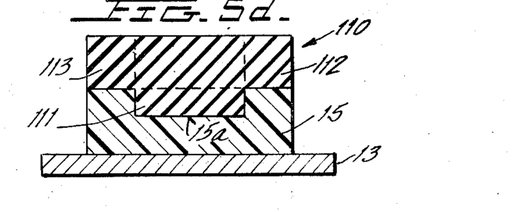
Figure 6:
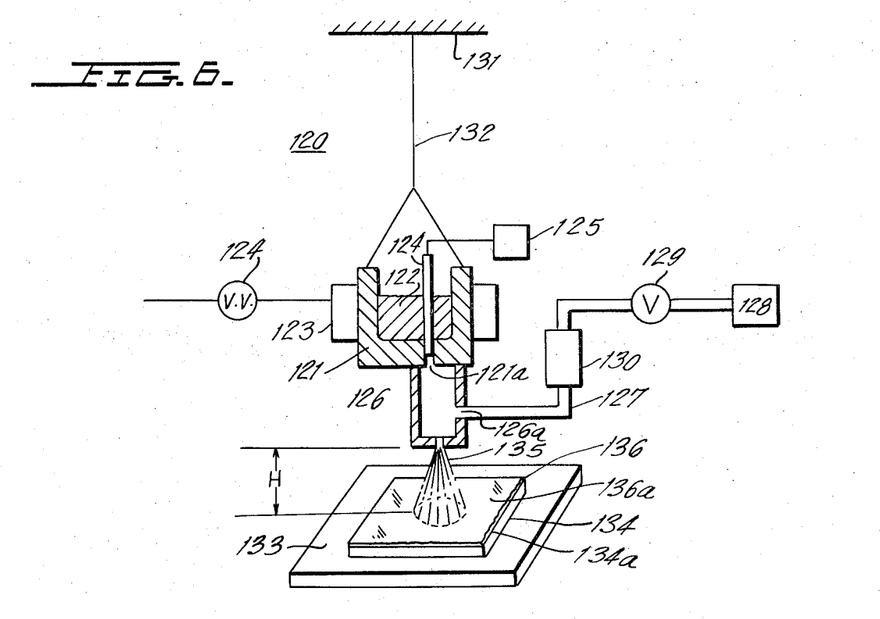
FIG. 6 shows an elevational view of apparatus employed in forming metallic die faces.

A similar technique to achieve a slightly different result may be employed in the manner which can best be understood in connection with FIG. 5d. As shown in FIG. 5d, it is desired that the plastic load 15, supported by electrode 13, have a contour whereby the central portion thereof is to be provided with a recess or cavity 15a. This necessitates the use of a resilient member 110 having a centrally located projecting portion 111 which extends well beyond the outlying portions 112 and 113, respectively. Assuming the dielectric constant plastic load is higher than the dielectric constant of the die member 110 the heating effect at the central portion 111 will be lower than the heating effect in the load portions lying beneath sections 112 and 113. Thus, it is desirable to provide a conductive filler material in the central section while the outer sections 112 and 113 of the compound resilient member 110 are provided with no such filler or, in the alternative, to provide all three sections with a conductive filler but to provide a greater concentration or amount of filler in central section 111. This may be accomplished by forming the resilient member in the following manner:

An end product having the contour of the plastic load 15, shown in FIG. 5e, is used as the "mold". Material, such as, for example, silicone rubber, is poured into the recess region 15a and an additive such as, for example, steel balls of relatively small diameter, or another powdered conductive material, is also poured into the recessed portion (either before, after, or during the filling of the recess with the resilient rubber material). Once the recess 15a is completely filled with rubber material and the conductive filler, the remaining region of the mold is then filled with silicone rubber alone or silicone rubber in conjunction with a much smaller concentration of metallic particles or balls. Thus, compound resilient members may be formed where either the hardness or the conductive characteristics, or both are altered, as an example of the lattermost junction with the metallic filler, if desired.

Figure 3F:
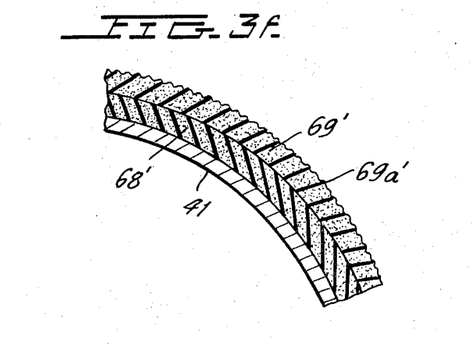
Figure 3G:
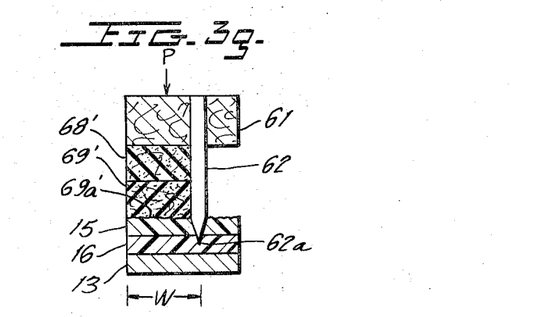
Figure 3H:
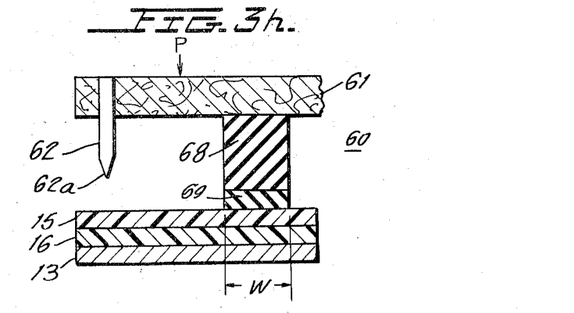

FIG. 3f shows still another embodiment of the present invention in which the resilient die face sheet and/or resilient backing material may be employed in an embodiment of the type shown in FIG. 1d. Only a portion of the embodiment of FIG. 1d has been reproduced in FIG. 3f for purposes of simplicity. As shown in FIG. 3f, the exterior surface of drum 41 is coated with a backing material 68' containing a metallic and/or resistive filler material. A die face sheet 69' perhaps containing either a metallic or a resistive filler (or both) is then wrapped around backing sheet 68'. The surface 69a' of die sheet 69' contains the particular pattern or texture which is to be reproduced upon the plastic sheet to be embossed (see plastic sheet 15 of FIG. 1d). If desired, the backing material layer 68' may be omitted in the embodiment of FIG. 3f. In operation, drum 41 (see FIG. 1d) is rotated together with the movement of metallic belt 42 and an RF generator is coupled thereacross so as to cause dielectric heating of the sheet (or sheets) fed therethrough wherein the exact pattern or texture desired is formed on to the face of the sheet engaging the textured face 69a' of resilient die face sheet 69'. The distinct advantage of the embodiment of FIG. 3f over the prior art arrangement of FIG. 1d is the ease and significant cost reduction of the resilient die 69' over the metallic die which was heretofore employed in conventional devices of the type shown in FIG. 1d.

FIG. 3g shows a die assembly of the "fixed die" type wherein steel rule 62, having cutting edge 62a is rigidly secured to a backing member 61. Backing material 68' containing a suitable metallic and/or resistive filler is positioned between backing member 61 and die face sheet 69' which likewise may contain a metallic and/or resistive filler. The positioning of the cutting edge 62 and the surface 69a' of resilient die face sheet 69' is relatively fixed. Compressive forces are exerted against the backing member 61 and electrode 13 causing tapered edge 62 to enter into sheet 15 and partially into sheet 16 to simultaneously perform the RF heat-sealing and tear-sealing operations. In addition to providing a surface portion of the resilient die face sheet with the sealing contour it is now for the first time possible to simultaneously form a pattern or a texture upon the surface of sheet 15 together with the performance of the heat-sealing and tear-sealing operations. This arrangement totally eliminates the need for purchasing plastic sheets and the like which have previously been textured, thereby enabling the user to purchase plastic sheeting which need be only of the appropriate color since the texturing or patterning may now be provided during the sealing and/or tear-sealing operations. The texturing of a plastic sheet is also possible through the use of any of the embodiments shown in FIGS. 3a–3e.

Whereas the embodiments described hereinabove have been primarily concerned with the embossing and/or sealing and/or cutting of plastic materials which become liquified upon the application of heat, it should further be understood that the present invention may be used with equal success with liquid plastics which become set or hardened upon the application of heat. Materials of this general type such as, for example, plastisols, have the characteristic of becoming set or hardening upon the application of heat whereas, prior thereto, the material remains in the liquid state, for example, at room temperature.

Figure 4B:
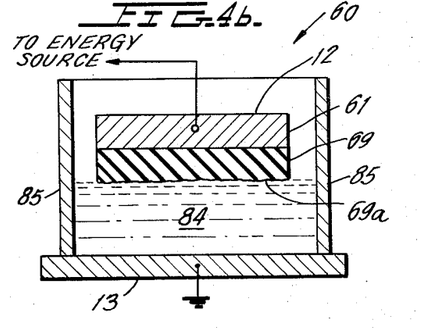
FIG. 4b shows a sectional view of another embodiment of the present invention in which liquid plastics such as plastisols may be employed to form a composite plastic product.

In the present invention, the plastisols may be utilized as the plastic material to be embossed or textured. As shown in FIG. 4b, a die assembly 60 comprised of rigid backing member 61 and die face sheet 69, impregnated with either conductive or resistive materials, or hardening materials or a combination thereof, is positioned face down with the textured surface 69a in surface engagement with a pool of plastisol material 84 deposited on the surface of electrode 13 which is further provided with liquid plastisol. RF energy is applied to the assembly shown in FIG. 4b so that backing member 61, which in the embodiment of FIG. 4b is preferably metal, serves as one electrode to form a capacitance together with electrode 13. The RF energy causes heating of the plastisol to a level sufficient to cause it to set, thereby forming a plastic sheet or member having the desired pattern. Cutting elements such as 62a of FIG. 3b may be employed with face die 69 of FIG. 3d item 69' to cut the plastisol after it has been cured. This method is especially desirable when a cloth or metal substrate is placed at the bottom of the plastisol before the plastisol is poured into the cavity formed by 85.

As still another alternative approach, it may, for example, be desired to laminate a plastic sheet to a metallic backing plate and to form either raised or embossed lettering upon the plastic sheet. In this case, an arrangement similar to that shown in FIG. 4b may be employed wherein electrode 13 may be a thin, metallic sheet which serves as an electrode for performing the RF heating operation or may be an additional metallic sheet in surface engagement with electrode 13 and having a plastisol deposited thereon. The surface of die face sheet 69 may be provided with either raised or embossed impressions to represent lettering so as to form either embossed, raised impressions, respectively, upon the surface of plastisol 84. The application of RF energy causes the plastisol to fuse and to simultaneously form the desired lettering of either raised or embossed type and to be fused or joined to the surface of the metallic backing sheet. Additionally, the compound die as described by FIGS. 3c and 3d may be used to cure the plastisol and to cut the backing sheet in the high pressure post - RF mode.

Figure 4C:
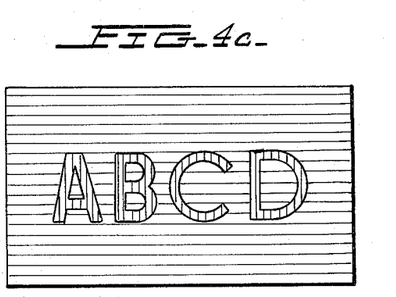
FIG. 4c shows a plan view of an end product.
Figure 4D:
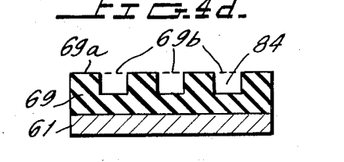
FIGS. 4d and 4e are elevational views showing die assemblies used in forming the end product of FIG. 4c.
Figure 4E:
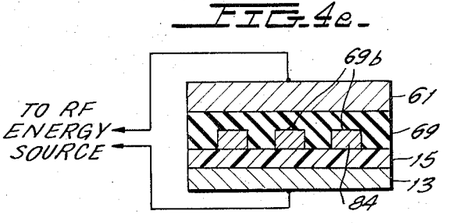

Another possible product which the present invention is capable of producing is one in which a plastic sheet 91 of a first color has provided thereon plastic of a second color which is fused thereto to form lettering 92 which may be of a second color. The product of FIG. 4c may be formed in the following manner:

A die assembly 60 of the type shown in FIG. 4d is provided with a metallic backing plate 61 having a resilient die face sheet 69 joined thereto and having its exposed surface 69a provided with cutout portions 69b in the form of the particular lettering 92 which is to be provided on the end product shown in FIG. 4c. A plastisol 84 (see FIG. 4e) is deposited upon the surface 69a of resilient die face sheet 69 so as to substantially fill all of the recesses formed in the face 69a of die face sheet 69. The die face sheet 69 may be produced through an operation similar to that described in connection with FIG. 4a. After depositing the plastisol 84 upon the surface of the die face sheet 69 so as to substantially completely fill the recesses 69b, the surface 69a is wiped clean so that the plastisol remains only in the recesses 69b. In order to facilitate wiping clean the surfaces 69a of plastisol suitable wetting agents such as, for example, liquid soaps may be added to the plastisol so as to facilitate complete removal of the plastisol from regions of the textured die face where it is desired to keep such regions free of the plastisol. This technique is important especially in those applications wherein the pressing of the die 69 against the plastisol may cause the plastisol to seep out of the crevices in the die face and collect upon areas where it is not desired to provide plastisol. As shown in FIG. 4e, the die face sheet 69 containing the plastisol 84 in recesses 69b is pressed against a plastic sheet 15 positioned upon electrode 13. RF energy is coupled to the electrodes 61 and 13 to a degree sufficient to heat plastisol 84 and plastic sheet 15, thereby causing the plastisol to fuse to sheet 15 and form the lettering 92 upon the base sheet 91 as shown in FIG. 4c. A more dramitic effect may be provided in the final product by choosing the plastisol 84 in plastic sheet 15 of different colors so as to greatly enhance the contrast therebetween. Additionally, the compound die as described by FIGS. 3c and 3d may be used to cure the plastisol and to cut the backing sheet in the high pressure post-RF mode.

If desired, the surface 69a of resilient die face sheet 69 may be provided with a textured pattern to impart a texture upon the background surface of sheet 91, which texture may be as simple or as intricate as is either desired or required since, as described hereinabove, the method for forming the die face sheet is quite simple and straightforward and by judiciously selecting the appropriate resilient material it is quite simple to reproduce any pattern or texture no matter how intricate especially in the case where silicone rubber is employed.

Figure 7A:
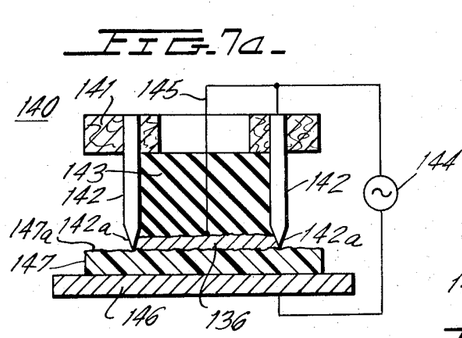
FIGS. 7a and 7b are elevational views showing RF heating apparatus employing a die face of the type formed by the apparatus of FIG. 6.
Figure 7B:
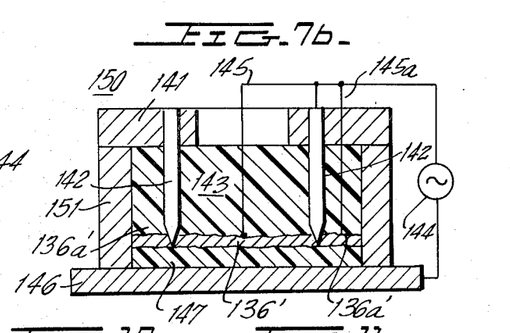

FIG. 7 shows apparatus 120 which may be advantageously employed for inexpensively forming metallic die faces of the type described hereinabove.

The apparatus 120 is comprised of a vessel 121 containing a metallic material 122 of low melting point. The metallic material may, for example, be eutectic alloys, solder, (50–50 or 60–40, for example) or any other metallic material of relatively low melting point. The vessel 121 is fitted with a heating element 123 electrically energized by a variable voltage source 124 for controlling the temperature of the vessel and appropriately heating its contents to a desired level. The adjustable or variable voltage source is provided so as to regulate the temperature of the metal or metallic composition 122 within vessel 121 in order that it be heated to its melting point but not above.

The vessel 121 is provided with an opening 121a along its bottom surface. Opening 121a receives a reciprocally mounted valve member 124 operated either by electrical or mechanical means 125 to regulate the rate of flow of molten material 122 through opening 121a which communicates with a mixing chamber 126 provided adjacent the bottom surface of vessel 121. The mixing chamber is provided with an orifice 126a which communicates with a tube or conduit 127 having its outlet end coupled to opening 126a and having its inlet end coupled to pressure source 128 connected to conduit 127 through a regulating valve 129. The variable voltage source 124 is also electrically coupled to a heating coil 130 for heating air passing through conduit 127 so that the air is heated before it enters mixing chamber orifice 126a. The rate of flow of the air may be controlled by regulating pressure source 128 as well as as adjustable valve means 129.

Mixing chamber 126 is further provided with an outlet orifice 126b provided along its bottom edge. Admission of air under pressure into orifice 126a creates a vacuum condition which causes the molten material (which is permitted to pass through opening 121a when valve means 124 is lifted) to be drawn into the interior of mixing chamber 126 by the vacuum condition created by the air entering into the chamber under pressure. The air admixes with the molten material causing it to be expelled from outlet orifice 126b. The die forming apparatus 120 is preferably suspended from an upper support 131 by means of a cable, chain or other supporting mechanism 132 so as to enable the apparatus to be moved in two mutually perpendicular directions substantially within a plane horizontal to a supporting surface 133. A master sheet 134 is positioned upon support 133 and has its textured surface 134a positioned immediately below the apparatus 120. The droplets of molten material are expelled from outlet orifice 126a together with the heated air and are caused to fan out so that the exiting droplets are all expelled within a conical-shaped region as defined by dotted lines 135. The outlet orifice 126b is positioned at a height H above textured surface 134a so that the small droplets of molten metal undergo a predetermined amount of cooling as they pass through outlet orifice 126b and before they are collected upon the textured surface 134a of master 134. The height displacement of outlet orifice 126b above texture surface 134a is selected so as to provide sufficient cooling of the molten material to prevent damage or burning of the master sheet 134 while at the same time causing the droplets of molten material to be in a fluid state sufficient to cause the droplets to conform to even the most minute details which make up the textured surface 134a.

The first group of droplets act to form a thin metallic film upon textured surface 134 whereby the droplets cool quite rapidly and solidify after collecting upon the textured surface. Layers of the metallic film may be built up by continuing the coating operation and preferably by moving apparatus 120 in the aforementioned mutually perpendicular directions so as to cause the entire surface area of the textured surface 134a to be coated with the metallic material. Once the layers of metallic material have been built up to a sufficient thickness, usually of the order of 0.10 inches the master sheet may be peeled away or otherwise removed from the metallic die face sheet which is now ready for use.

It has been found that the thickness of the metallic die face sheet will be non-uniform with the portions of the die face sheet covering the peripheral portions of the die face sheet having a thickness less than the thickness of the die face sheet in the center region of the master sheet. In order to compensate for this non-uniform thickness, the metallic die face sheet 136 is provided with a resilient backing as will be more fully described. In building up the thin layers of metal upon the master sheet the textured surface 134a, preferably subsequent layers are put down after the preceding layers have had sufficient time to cool so as to prevent the layer presently being formed from heating and/or melting any preceding layer or layers. Once a die face of sufficient thickness has been formed, the metallic material 136a which forms in the region of the edge of the master sheet 134 is trimmed away.

Figures 8, 9, 10, 11:
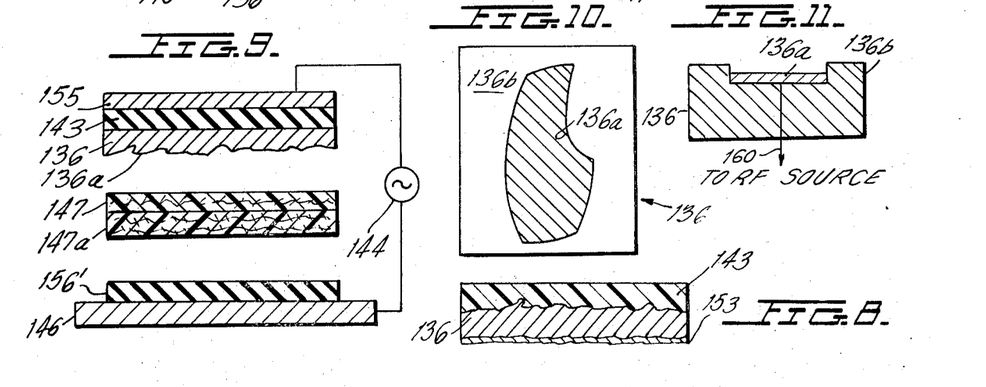
FIG. 8 is an elevational view showing a die face assembly modified from that shown in FIG. 6 and which may be employed in the apparatus as shown, for example, in FIGS. 7a and 7b.
FIGS. 9 and 10 are elevational and plan views respectively, showing apparatus which may employ die faces of the type described in FIGS. 6 and 8.
FIG. 11 shows a sectional view of a die face which may be utilized in practising the invention.

FIG. 8a shows RF heating apparatus 140 employing a die face 136 of the type formed by the apparatus of FIG. 7. The assembly 140 comprises a rigid backing member 141 which may, for example, be wood, having a steel rule 142 with a cutting edge 142a rigidly secured to backing member 141. The region within steel rule 142 and adjacent the lower surface of backing member 141 is filled with a resilient material 143 such as, for example, rubber. The region is sufficiently filled so as to accurately locate die face member 136 relative to the cutting edge 142a of steel rule 142. The electrical path between die face 136 and RF source 144 may be established through steel rule 142. Since the inner face between steel rule 142 and the periphery of die face 136 may have a substantially high resistivity, this power loss may be eliminated by providing an electrical lead 145 electrically coupled between the rear of die face 136 and one terminal of the RF energy source 144. The lead 145 may be imbedded within resilient material 143.

RF energy source 144 is further coupled to a second electrode 146. A workpiece 147 which may, for example, be a vinyl sheet or alternatively may be a vinyl sheet laminated or to be laminated to a fabric sheet, is positioned between electrode 146 and metallic die face 136 which operates as the other electrode. Pressure is applied to cause the surface of die face 136 to make intimate contact with the surface of the workpiece sheet 147 upon the application of RF energy so as to exactly reproduce the texture in the die face upon the upper surface 147a of the workpiece sheet. Upon completion of the heat-sealing and/or the texturing operation, additional pressure is applied to the die assembly to cause the cutting edge 142a to pierce workpiece 147 whereby the excess material lying outside the perimeter of the cutting edge may be stripped away.

If desired, the compound die assembly of FIG. 8a may be modified to form a fixed die assembly by using a substantially non-resilient backing material to fill the region occupied by the material 143. The fixed die assembly may then be utilized in the same manner as the structure of FIG. 1b which has been described hereinabove.

In applications wherein the die face is employed in a fixed or compound die assembly, the die face may be formed within the steel rule in the following manner:

The master sheet is placed upon a suitable work surface and the steel rule is clamped against the master sheet so as to form or define a "mold". Through the use of apparatus of the type shown in FIG. 7, the molten metal is coated upon the work sheet in the manner described hereinabove. Since the molten droplets cool rapidly and since their temperature level at the time that they strike the steel rule is quite low compared to the melting temperature of the steel rule, the layers of cooled molten material do not adhere to the steel rule but do however make engagement with the interior vertical surfaces of the steel rule.

After completion of the metallic die face coating operation, the remainder of the interior region between the steel rule 142, the upper surface of the die face sheet 136 and the rigid backing member 141 may be filled with an epoxy of either resilient or non-resilient type so as to complete the die assembly. Since the cooled metal does not adhere to the steel rule, the die forming technique described herein may be used with equal success in forming either fixed or compound die assemblies.

FIG. 8b shows a modified die assembly relative to that shown in FIG. 8a wherein the assembly 150 may be employed for texturing and/or sealing on both sides of the cutting edge. The assembly 150 is comprised of a rigid backing member 141 which may, for example, be wood. Die face sheet 136' is formed so as to lie in the region within steel rule 142 as well as extending beyond the exterior periphery of steel rule 142 in the region shown as 136a'. The region immediately behind the central portion 136' of the die face is filled with a suitable epoxy 143. A hollow region is further defined between the exterior periphery of steel rule 142 and a rigid wall or projecting portion 151 surrounding steel rule 142. The hollow region above the exterior portion 136a' of the metallic die face is likewise filled with a suitable epoxy material 143a. The RF energy source 144 is coupled directly to the metallic die face portions 136' and 136a' by suitable electrical leads 145 and 145a. The assembly 150 of FIG. 8b is pressed against a workpiece sheet 147 positioned upon an electrode 146 which functions as the layup plate for the assembly.

The RF apparatus of FIG. 8b may be employed to laminate a plurality of sheet, to texture the topmost sheet and to perform a seal cut or tear seal operation, as the case may be. Selection of the appropriate epoxy (i.e. resilient or non-resilient) permits the use of the die assembly 150 of FIG. 8b as either a fixed or compound die assembly.

FIG. 9 shows an elevational view of a die face sheet 136 of non-uniform thickness having a backing layer 152. The backing layer may be an epoxy to compensate for non-uniformity in the thickness of the die face sheet 136. In those applications which require a stronger and/or more durable die face, the textured surface of die sheet 136 may be plated with any suitable metallic material through the use of conventional plating techniques. For example, the die sheet may be immersed in an electrolyte and an electric current is applied thereto to cause the metallic particles of one of the electrodes immersed in the electrolyte to be plated upon the textured face of the die sheet. Other plating techniques may be emplyed, if desired. The plating material is optional. However, plating materials such as nickel or iron serve to provide additional heating when RF energy is applied to the die face so as to enhance and thereby hasten the texturing and/or sealing operation.

As another alternative technique, a die face may be formed of a low melting point material which is then plated with a metal having a high melting point. After plating, the low melting point material may then be melted or boiled away at low temperature (relative to the plated material) with the plating remaining to form a reverse or negative die. The remaining plating may then be employed to form a final positive die face by filling same with a metal of high melting point and great strength as compared with low melting point metal or metallic compositions such as solder or eutectic alloys to thereby produce a more rugged longer lasting die face. This technique is similar to that technique known as the "lost wax" technique. The low melting point metal may be reheated and reused to form subsequent die faces with no loss in material in any of the above mentioned methods.

The backing of the die face may be either a resilient or non-resilient epoxy which, if desired, may be filled with a metallic material as was described in connection with FIGS. 3c, 3d, 3e and 3g, for example, to further enhance the RF heating operation.

FIG. 10 shows an RF apparatus which may be employed in any of the die face embodiments described herein. The apparatus of FIG. 10 is comprised of a die sheet 136 having a textured surface 136a. A resilient or non-resilient backing sheet 143 is sandwiched between die face 136 and a rigid metallic plate 155. Die face 136 is either coupled to metallic plate 155 or source 144 which is coupled to the supporting electrode 146. A plastic load which may, for example, be comprised of a plastic or vinyl sheet 147 and a plastic or rubber impregnated fabric backing 147a, is sandwiched between a highly resilient bed 156 which may, for example be rubber and the die face sheet 136. In those applications wherein the undulations or crevices provided in the pattern face 136a of die face sheet 136 may be rather deep, resilient sheet 156 acts to urge the sheet 147 being textured into each and every one of the undulations or crevices provided in the die face sheet patterned surface 136a. The use of the rubber bed 156 may be employed with equal success in any of the embodiments of FIGS. 2–5 which employ a resilient die face sheet.

The die face may be adapted to receive precut work pieces. In such instances, it becomes advantageous to provide a die having a cavity or recess which substantially conforms to the periphery or outline of the precut sheet or sheets. FIG. 11, for example, shows a plan view of a die member 136 having a recessed portion 136a which is textured or otherwise patterned as shown. The remaining surface 136b of the die face sheet is substantially flat. If desired, the die assembly may consist of a die face sheet 136a set within a recess provided in a rigid member designated by numeral 136b in FIG. 11 which may, for example, be a thick sheet of wood having the outline as shown cut out from its center portion to receive the die face. A resilient or non-resilient member 136b may be positioned behind die face sheet 136a as shown best in FIG. 11 and an electrical lead 160 coupled to die face sheet 136a may be provided to couple the die face sheet to the RF source. The advantage of the die assembly of FIG. 11 resides in the fact that the work sheet may be accurately and rapidly positioned by providing the recess in which the precut member is positioned. If desired, the technique of FIG. 11 may be employed with resilient die face sheets.

It can be seen from the foregoing description that the present invention provides a novel method and apparatus for sealing and/or embossing and/or cutting a plastic sheet (or sheets) through the use of a resilient or rigid die face sheet which is quite simple to fabricate, which can quite precisely reproduce any pattern or design no matter how intricate and which lends itself quite advantageously to the heating, sealing and cutting operations through the use of RF heating equipment. The present invention may be employed to fabricate a wide variety of different end products including, but not limited to, inflatable toys, pocket books, raincoats, belts, shoe uppers, plastic signs (with or without metal backplates), embossed or textured plastic sheets, with or without woven fabric or non-woven fabric layers of substrates, and multicolored plastic sheets, either textured or untextured. Through the use of the present invention, it is now for the first time possible to inexpensively seal and/or to emboss or otherwise form textures or patterns on the surface of plastic members simultaneously with the performance of heating and/or sealing and/or tear-cutting and/or cutting operations.

Although there has been described a preferred embodiment of this novel invention, many variations and modifications will now be apparent to those skilled in the art. Therefore, this invention is to be limited, not by the specific disclosure herein, but only by the appending claims.

I claim:

1. A method of using a compressible die member to form patterns on a plastic sheet comprising the steps of:

providing a mold having raised portions of a contour adapted to form cavities in the contoured surface of a resilient material poured into said mold;

removing the resilient material from the mold after setting;

filling only said cavities with a liquid plastisol;

sandwiching a substrate under compression between the surface of said resilient member containing the plastisol and an electrode;

dielectrically heating the plastisol by coupling high frequency energy to said resilient member and said electrode to set said plastisol and fuse it to the substrate whereby the contour formed by the plastisol on the substrate substantially exactly reproduces the contour of said cavities.

* * * * *